| United States Patent [19] | [11] Patent Number: 4,896,741 |
|---|---|
| Kawai et al. | [45] Date of Patent: Jan. 30, 1990 |

[54] PASSIVE SEAT BELT SYSTEM

[75] Inventors: Osamu Kawai; Shunzi Mizumura, both of Fujisawa, Japan

[73] Assignee: Nippon Seiko Kabushiki Kaisha, Tokyo, Japan

[21] Appl. No.: 289,427

[22] Filed: Dec. 23, 1988

Related U.S. Application Data

[63] Continuation-in-part of Ser. No. 91,986, Sep. 1, 1987, abandoned.

[30] Foreign Application Priority Data

Sep. 2, 1986 [JP] Japan ................................. 61-205115
Sep. 1, 1987 [JP] Japan ................................. 62-216379

[51] Int. Cl.⁴ ........................ B60R 21/00; B60R 22/00
[52] U.S. Cl. ..................................... 180/268; 307/10.1
[58] Field of Search ................ 180/268, 270; 280/801, 280/807; 297/469, 474; 307/10 R, 10 SB; 340/52 E

[56] References Cited

U.S. PATENT DOCUMENTS

| 4,096,468 | 6/1978 | Kopera, Jr. ................... | 180/270 |
| 4,236,141 | 11/1980 | Terabayashi et al. ............ | 180/268 |
| 4,321,979 | 3/1982 | Kuroyama et al. .............. | 180/268 |
| 4,410,061 | 10/1983 | Terabayashi .................... | 180/268 |
| 4,411,448 | 10/1983 | Takada ........................... | 180/268 |
| 4,655,476 | 4/1987 | Paludetto ....................... | 180/268 |

Primary Examiner—Richard A. Bertsch
Attorney, Agent, or Firm—Shapiro and Shapiro

[57] ABSTRACT

A passive seat belt system comprises drive means for reciprocating a seat belt, first detector activated in response to opening and closing of a door, a second detector activated when a slider of the seat belt is at a predetermined position, first control means for controlling the drive means in accordance with the detection outputs of the first and second detectors, and second control means for causing the first control means to drive the seat belt backward when the first or second detector fails or is in an abnormal state.

11 Claims, 13 Drawing Sheets

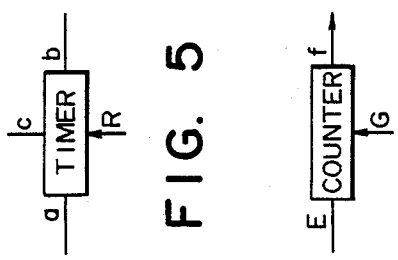
FIG. 5
FIG. 6
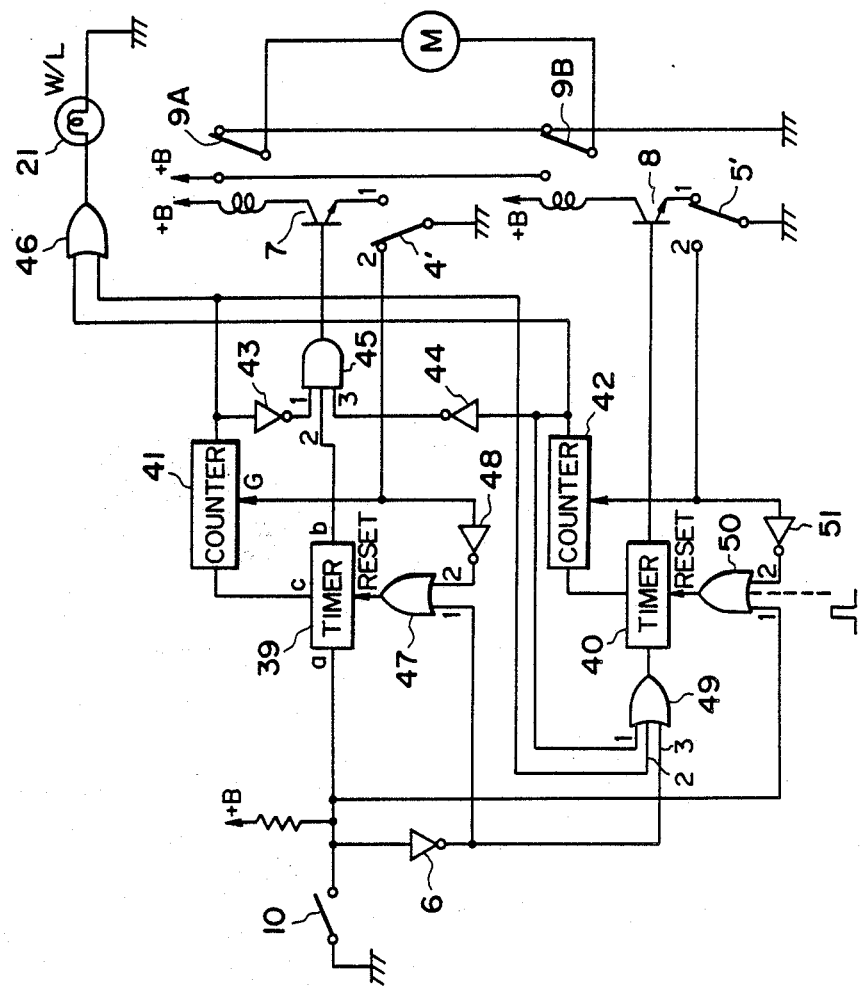
FIG. 4

PASSIVE SEAT BELT SYSTEM

This is a continuation-in-part of application Ser. No. 091,986 filed Sept. 1, 1987, now abandoned.

BACKGROUND OF THE INVENTION

1. Field of the Invention

The present invention relates to a passive seat belt system, and more particularly to a passive seat belt system having means for securing safety of a vehicle occupant when detection means for controlling actuation of the seat belt has a fault.

2. Related Background Art

A passive seat belt system in which a slidable anchor fixed to a seat belt is moved forward and backward of a car body as a door is closed and opened to fasten and release a vehicle occupant is known by, for example, U.S. Pat. Nos. 4,410,061 and 4,321,979. The former has a control circuit which uses a timer and the latter has an alarm device.

FIG. 1 shows an example of a known timer-controlled passive seat belt system. Numeral 1 denotes a door switch which is opened when a door is open, numeral 2 denotes a forward timer which monitors a movement time of the seat belt in the direction toward a forward end of a slider (not shown), numeral 3 denotes a backward timer which monitors a movement time of the seat belt in the direction of a backward end of the slider, numeral 4 denotes a forward end switch which is opened when the slider reaches the forward end, and numeral 5 denotes a backward end switch which is opened when the slider reaches the backward end.

If the seat belt is in a fasten state and the door is opened to open the door switch 1, the timer 3 is reset and an input terminal of the timer 2 is rendered HIGH so that the timer 2 is activated to turn on a transistor 7 which energizes a relay 9A to drive a motor M until the slider reaches the forward end and the forward end switch is opened.

When the seat belt is in a release state and the door is closed to close the door switch 1, an input terminal of an inverter 6 is grounded and an output of the inverter is rendered HIGH so that the timer 2 is reset and the timer 3 is activated to turn on a transistor 8 which energizes a relay 9B to drive the motor M in the opposite direction until the slider reaches the backward end and the backward end switch 5 is opened.

In the prior art passive seat belt system, if the door switch has a fault such that the input terminal thereof is opened, it is always determined as a door open state, and the slider does not move backward so that the seat belt does not assume the fasten state. On the other hand, if the door switch is shorted, it is always determined as a door close state, and the slider does not move forward so that the seat belt does not assume the release state. In the former case, the vehicle occupant is not fastened and the seat belt does not function as intended, thereby causing poor safety.

SUMMARY OF THE INVENTION

It is an object of the present invention to provide a passive seat belt system which eliminates the drawbacks described above.

It is another object of the present invention to provide a passive seat belt system which resolves problems encountered when detection means for controlling the operating of the passive seat belt has a fault in order to enhance safety of the system.

BRIEF DESCRIPTION OF THE DRAWINGS

FIG. 4 shows a configuration of a third embodiment of the present invention,

FIGS. 5 and 6 show timer and counter used in the third embodiment,

FIG. 16 shows a configuration of a ninth embodiment of the present invention, and FIG. 17 shows the truth table of a flip-flop employed in the embodiment of FIG. 16.

DETAILED DESCRIPTION OF THE PREFERRED EMBODIMENTS

Figure 2:
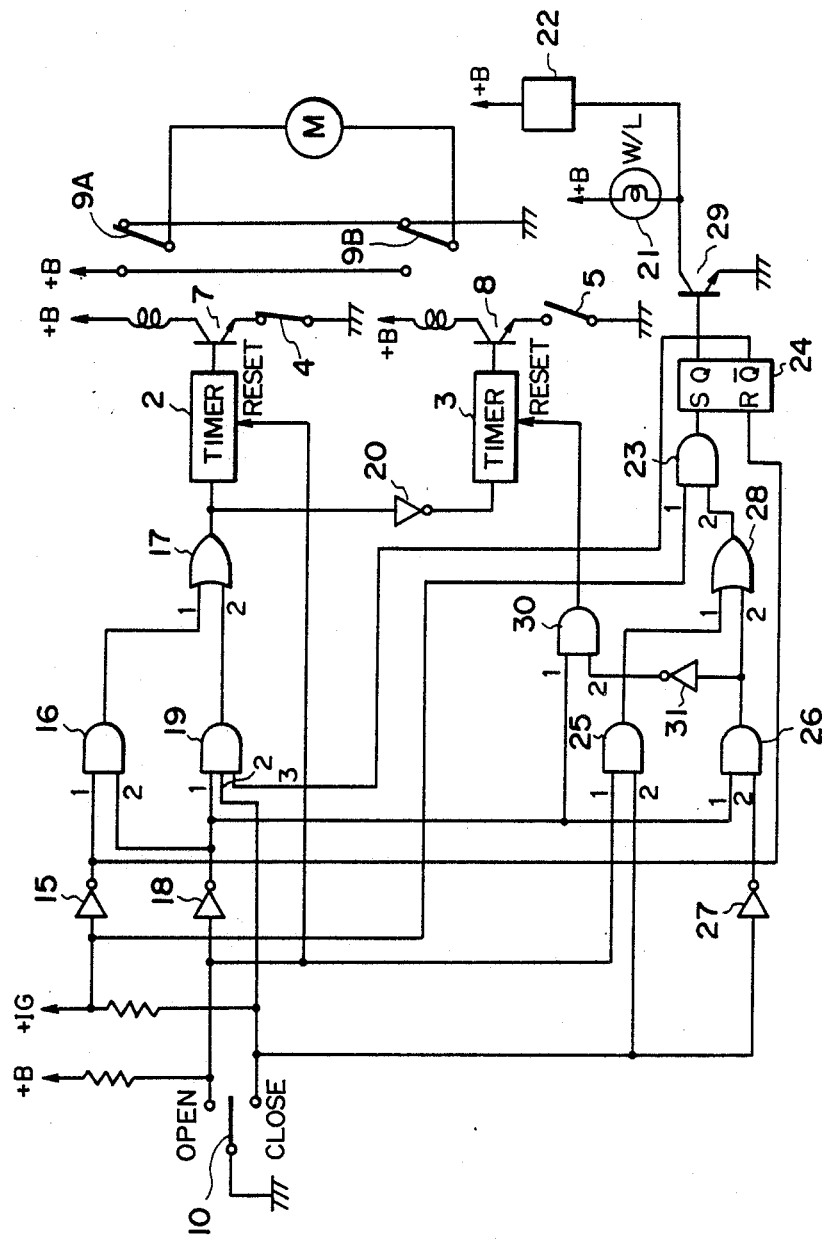
FIG. 2 shows a configuration of a first embodiment of the present invention.

FIG. 2 shows a first embodiment of the present invention. A door switch 10 produces two contact signals, normally open signal and normally close signal, in accordance with the door open/close state. When an open contact of the door switch 10 is LOW and a close contact is HIGH, the outputs of the two contact signals from the door switch 10 indicates a door open mode, and in the reverse state, they indicate a door close mode.

In FIG. 2, a line +B is connected to a battery and a line +IG is connected to the battery through an ignition switch (not shown).

A normal mode operation when the ignition switch is ON is first explained. Since an input to the inverter 15 is always HIGH, an output thereof is always LOW. Accordingly, an output of an AND logic 16 which receives the output of the inverter 15 is always LOW. This LOW output is applied to an OR logic 17 through an input terminal 1 thereof. A timer 2 is connected to the output of the OR logic 17. Since the input 1 of the OR logic 17 is LOW, the timer 2 operates in accordance with the input 2 and not in accordance with the input 1 of the OR logic 17.

When both the two signal outputs of the door switch 10 exhibit the door open mode, an input of an inverter 18 which is connected to the open terminal of the door switch 10 is LOW and hence an input 1 of an AND logic 19 connected to the output of the inverter 18 is HIGH. In the door open mode, the input 2 of the AND logic 19 which is connected to the close terminal of the door switch 10 is HIGH because the ignition switch is ON, and the input 3 is also HIGH unless it is in an abnormal mode. Accordingly, all of the three inputs to the AND logic 19 are HIGH, and this HIGH output is supplied to the input 2 of the OR logic 17. Thus, the OR logic 17 produces the HIGH output to activate the timer 2 and drive the seat belt forward.

When the ignition switch is ON and the two signal outputs of the door switch are door close mode, the inputs 1 and 2 of the AND logic 19 are in the LOW and the output thereof is also LOW. Accordingly, the output of the OR logic 17 is LOW and the timer 3 is activated through the inverter 20 to drive the seat belt backward.

When the ignition switch is ON and the door switch fails so that the two signal outputs exhibit different door modes, the operation is as follows. For example, in FIG. 2, if both contacts of the door switch 10 are grounded, the input 2 of the AND logic 19 is LOW and the seat belt is driven backward as is done when the two signal outputs of the door switch 10 are in the door close mode. When both contacts of the door switch 10 are open, the input 1 of the AND logic 19 is LOW and the seat belt is driven backward.

The operation when the ignition switch is OFF is now explained. Since the output of the inverter 15 is always HIGH, the input 1 of the AND logic 16 is always HIGH. Accordingly, the output of the AND logic 16 depends on the other input 2. Since the input 2 of the AND logic 16 is supplied from the output of the inverter 18, when the OPEN contact of the door switch 10 is in the door-open mode (LOW), the input 2 is HIGH and the output of the AND logic 16 is HIGH. When the OPEN contact of the door switch 10 is in the door-close mode (HIGH), the input 2 is LOW and the output of the AND logic 16 is LOW.

Since the input 2 of the AND logic 19 is always LOW independently from the state of the door switch when the ignition switch is OFF, the output of the AND logic 19 is always LOW independently from other inputs 1 and 3. Since this LOW output is supplied to the input 2 of the OR logic 17, the output of the OR logic 17 depends on the input 1, that is, the output of the AND logic 16.

The output of the AND logic 16 depends on the input 2 as described above and the input 2 depends on the open/close mode of the door switch 10. Accordingly, when the OPEN contact of the door switch 10 is in the dooropen mode, the output of the OR logic 17 is HIGH to activate the timer 2, and when it is in the door-close mode, the output of the OR logic 17 is LOW and the timer 3 is activated thorugh the inverter 20.

In the present embodiment, when the ignition switch is ON and the door switch is in an abnormal mode (the two contact signals exhibit different door open/close modes), an alarm lamp 21 may be fired and an alarm chime 22 may be actuated. The operation thereof is described below.

Since the ignition switch is ON, the input 1 of the AND logic 23 is always HIGH. Thus, the output of the AND logic 23 depends on the other input 2. Since a set input of a flip-flop 24 is supplied from the AND logic 23, the output of the flip-flop 24 responds to the input 2 of the AND logic 23.

Since the two inputs of the AND logic 25 are directly connected to the two contacts of the door switch 10 and the two inputs of the AND logic 26 are connected to the two contacts of the door switch 10 through the inverters 18 and 27, respectively, the AND logics 25 and 26 operate inversely.

Assuming that the two contacts of the door switch 10 fail and are grounded, the two inputs of the AND logic 26 are HIGH and hence the output of the AND logic 26 is HIGH. Accordingly, the OR logic 28 which receives this HIGH output produces a HIGH output which is supplied to the input 2 of the AND logic 23. Since the output of the AND logic 23 depends on the input 2 when the ignition switch is ON as described above, when the output of the OR logic 28 is HIGH, the output of the AND logic 23 is HIGH and it sets the flip-flop 24 to render a Q output thereof HIGH. As a result, a transistor 29 is turned on to fire the alarm lamp 21 connected to the collector of the transistor 29 and actuate the alarm chime 22 connected to the collector of the transistor 29.

Since the $\overline{Q}$ output of the flip-flop is connected to the input 3 of the AND logic 19, the $\overline{Q}$ output is LOW in the abnormal mode so that the output of the AND logic 19 is rendered LOW.

When the two contacts of the door switch 10 are open (they may be open in an imperfect close state of the door when door transfer contacts are used), the two inputs of the AND logic 25 are HIGH and the AND logic 25 is conditioned so that the alarm lamp 21 is fired and the alarm chime 22 is actuated.

In order to release the alarm lamp 21 and the alarm chime 22, the ignition switch is turned off and a HIGH signal is applied to a reset terminal of the flip-flop 24. Alternatively, a manual reset switch may be provided or turn-on/off on the +B signal or battery signal may be utilized in place of the ignition switch signal. (In this case, isolation of the battery is necessary to reset the alarm.) A key switch signal may be utilized in place of the ignition switch signal.

In the embodiment of FIG. 2, the timer 3 is activated in the abnormal mode to drive the seat belt backward. When the two contacts of the door switch 10 are LOW, if the output of the inverter 18 were applied directly to the reset terminal of the timer 3, the reset input of the timer 3 would HIGH simultaneously when the input of the timer 3 or the output of the inverter 20 is rendered HIGH and hence the timer output would not supplied to the transistor. Accordingly, when the two contact signals of the door switch 10 are LOW, the output of the inverter 31, which receives the output of the AND logic 26, and the output of the inverter 18 are supplied to the AND logic 30 and the output of the AND logic 30 is supplied to the reset terminal so that the reset input is not applied to the timer 3. Namely, when the two contact signals of the door switch 10 are LOW (abnormal mode), the output of the AND logic 26 is HIGH and the output of the inverter 31 is LOW so that the reset signal is blocked by the AND logic 30.

Figure 3:
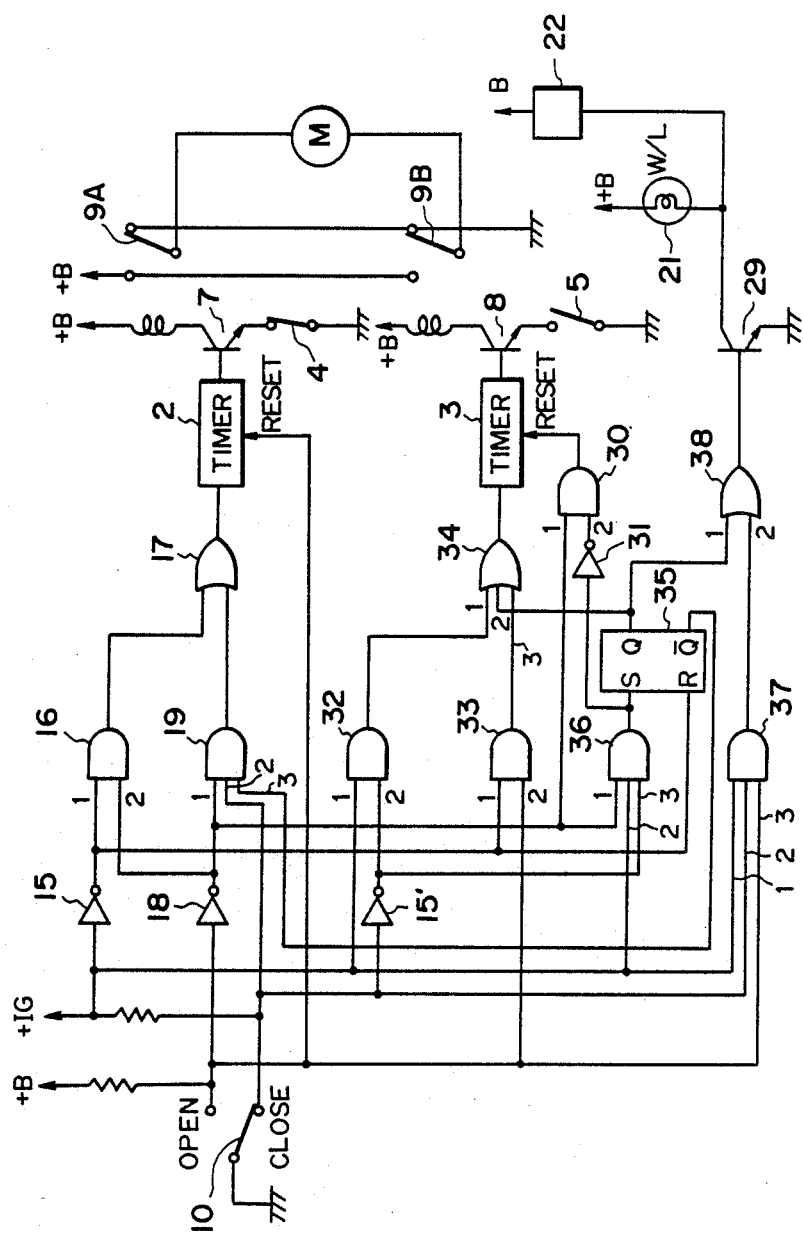
FIG. 3 shows a configuration of a second embodiment of the present invention.

FIG. 3 shows a second embodiment of the present invention. The like elements to those shown in FIG. 2 are designated by the like numerals.

An input 1 of an AND logic 32 is connected to a line +IG and an input 2 is connected to a CLOSE terminal of a door switch 10 through an inverter 15'. An input 1 of an AND logic 33 is connected to the line +IG through an inverter 15 and an input 2 is connected to an OPEN terminal of the door switch 10. The AND logics 32 and 33 operate inversely in response to turn-on/off of the ignition switch to activate a timer 3 through an OR logic 34. An input 2 of an AND logic 36 is connected to the line +IG. Since input 2 is always HIGH when the ignition switch is ON, the AND logic 36 operates in accordance with the other inputs 1 and 3. When the ignition switch is OFF, the input 2 is LOW and the output of the AND logic 36 is LOW independently from the other inputs 1 and 3. The input 1 is connected to the OPEN terminal of the door switch 10 through the inverter 18, and the input 3 is connected to the CLOSE terminal of the door switch 10 through the inverter 15'.

A set input of a flip-flop 35 is connected to the output of the AND logic 36 and a Q output of the flip-flop 35 is supplied to the timer 3 through the OR logic 34. Reset (R) terminal and $\overline{Q}$ output terminal are connected to the output of the inverter 15 and the input 3 of the AND logic 19, respectively, as are done in FIG. 2.

An input 1 of an AND logic 37 is connected to the line +IG and inputs 2 and 3 thereof are connected to the CLOSE and OPEN contacts of the door switch 10, respectively. Thus, when the ignition switch is ON, the output of the AND logic 37 depends on the inputs 2 and 3.

The output of the flip-flop 35 and the output of the AND logic 37 are supplied to an OR logic 38 an output of which drives an alarm lamp 21 and an alarm chime 22.

The operation of the present embodiment is described below.

The control operation for the forward movement of the slider which depends on the timer 2 is similar to that of the embodiment of FIG. 2, and hence the description thereof is omitted.

The operation of the timer 3 in a normal mode is first explained. When the ignition switch is ON, the AND logic 32 depends on the mode of the CLOSE contact of the door switch 10. When it is in the close mode (LOW), the AND gate 32 produces a HIGH signal to activate the timer 3 through the OR logic 34 so that the seat belt is driven backward. When the ignition switch is OFF, the AND logic 33 depends on the mode of the OPEN contact of the door switch 10 and produces a HIGH signal in response to the door OPEN mode (HIGH) to activate the timer 3 through the OR logic 34.

The operation to the timers 2 and 3 in the abnormal mode is described below. If the two contacts of the door switch 10 are grounded when the ignition switch is ON, the AND logic 36 is conditioned to set the flip-flop 35. Accordingly, the Q output is rendered HIGH and it activates the timer 3 through the OR logic 34. When the ignition switch is OFF, the input 2 of the AND logic 36 is LOW and the flip-flop 35 is not set. Thus, the timer 3 is not activated. In this case, the AND logic 16 is conditioned to activate the timer 2.

When the ignition switch is ON and the two contacts of the door switch 10 are OPEN, the input 2 of the AND logic 32, the input 1 of the AND logic 33 and the inputs 1 and 3 of the AND logic 36 are LOW so that none of the AND logics is turned on and the timer 3 is not activated. When the ignition switch is OFF, the AND logic 33 is conditioned to activate the timer 3.

The operation in the abnormal mode is summarized as follows.

When the ignition switch is ON and the door switch is in the abnormal mode:

(1) If the two contact signals are LOW, the timer is activated to move the seat belt backward for security.

(2) If the two contact signals are HIGH, the timer 3 is not activated and the signals are ignored.

When the ignition switch is OFF, the timers 2 and 3 are activated in accordance with the door mode of the signal which is OPEN when the door is open (OPEN contact).

The supply of the reset signal of the timer 3 is controlled by a circuit comprising the AND logic 30 and the inverter 31 as is done in the embodiment of FIG. 2.

The alarm in the abnormal mode is now explained. When the ignition switch is ON and the two contacts of the door switch 10 are grounded, the three inputs of the AND logic 36 are HIGH so that the AND logic 36 is conditioned to supply the HIGH output to the flip-flop 35. Thus, the OR logic 38 which receives the Q output of the flip-flop 35 is conditioned to turn on the alarm driving transistor 29 which activates the alarm lamp 21 and the alarm chime 22.

When the ignition switch is ON and the two contacts of the door switch 10 are open, the three inputs of the AND logic 37 are HIGH so that the AND logic 37 is conditioned to produce the HIGH output which is supplied to the alarm driving transistor 29 to activate the alarm lamp 21 and the alarm chime 29.

The alarm may be reset by turning off the ignition switch, etc. in the same manner as that in the embodiment of FIG. 2.

FIG. 4 shows a third embodiment of the present invention. The like elements to those shown in FIGS. 2 and 3 are designated by the like numerals. In the present embodiment, the numbers of times that a forward timer 39 and a backward timer 40 time out are counted by a counter 41 and a counter 42, respectively, and when the number of times exceeds a predetermined value, the seat belt is driven backward or an alarm is issued.

The present embodiment is described below in contrast to a conventional system.

Figure 1:
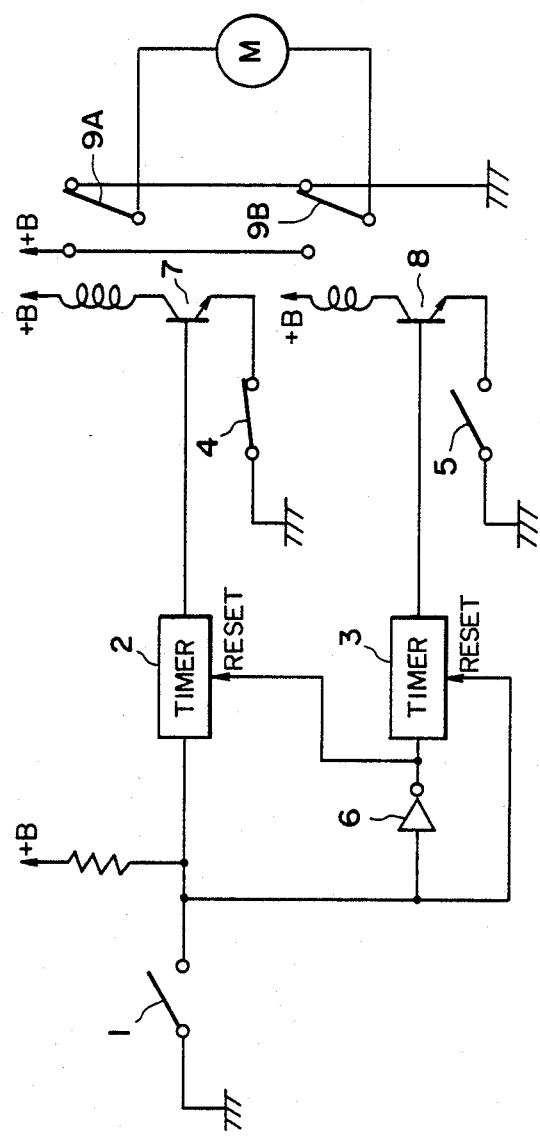
FIG. 1 shows a prior art passive seat belt control circuit.

In the circuit of FIG. 1, if the door is closed when the backward end switch 5 fails and the contact is always in the close state, the slider of the seat belt is driven to the backward end but the backward switch does not open even when the slider reaches the backward end. Thus, the energization of the relay coil is not blocked and the current continuously flows into the motor until the backward timer (timer 3) times out.

In such a failure of the backward end switch, the same operation is repeated again and again even after the timer times out and the energization of the motor is blocked, unless the failure is removed. As a result, the motor may be damaged, the relay contact may be damaged or the slider or a drive member therefor may be damaged because the slider impacts the backward end.

The timer which monitors the movement of the slider may also be timed out when a vehicle occupant holds the slide anchor by his/her hand, or a heavy load is applied to the motor by some reason so that the slide anchor does not reach the backward end. In order to detect the time-out of the timer due to the failure of the backward end switch, the counters shown in FIG. 4 are provided in the present embodiment. The failure of the backward end switch is determined when the timer times out more than the predetermined number of times.

When the backward end switch fails, the timer necessarily times out. Accordingly, if the timer does not time out when the slider reaches the backward end, it may be determined that the backward end switch is normal. Thus, the counter may cleared or the count may be decremented by a predetermined count in such a case so that the precision of detection of failure is improved.

When the failure of the backward end switch (or forward end switch) is detected, an alarm may be issued. In such a case, the slider may be driven to a lock position and held therein for security.

The configuration and operation of the embodiment of FIG. 4 are now explained.

The timers 39 and 40 correspond to the aforementioned timers 2 and 3. Referring also to FIG. 5, when a level 1 (HIGH) signal is applied to an input a, the timer produces a level 1 (HIGH) output b for a predetermined period and thereafter holds a level 0 (LOW) output. (The output b does not change even if the input a changes after the predetermined period.) An output c produces one pulse when no reset signal is applied before the timer times out.

Referring also to FIG. 6, each of the counters 41 and 42 increments when a pulse is applied to an input E and decrements or clears when a reset input G is LOW. An output f keeps level 1 (HIGH) when the counter counts up.

In the normal state, the outputs of the counters 41 and 42 are zero and the outputs of the inverter 43 and 44 connected to the outputs f of the counters are HIGH. The outputs of the inverters 43 and 44 are supplied to the inputs 1 and 3 of the AND logic 45, respectively. Thus, the inputs 1 and 3 of the AND logics 45 are HIGH and the outputs of the AND logic 45 depends on the other input 2.

If the door switch 10 is opened under this condition, the input a of the timer 39 connected to the door switch is rendered HIGH and the output b thereof supplies a HIGH signal to the input 2 of the AND logic 45 for a predetermined period. As a result, the output of the AND logic 45 is rendered HIGH so that the relay driving transistor 7 connected thereto is turned on for the predetermined period. Thus, the relay 9A is energized to drive the motor M which transports the slider of the seat belt to the forward end. If the slider reaches the forward end within the predetermined period, the contact 1 of the forward end switch 4' is opened and the drive of the motor M is stopped. The other contact 2 (front contact) of the switch 4' is grounded and the input G of the counter 41 is rendered LOW. As a result, the counter 41 is reset or decremented by a predetermined count.

If the forward end switch 4' fails and the contact 1 is kept grounded, the motor M is energized until the timer 39 times out. When the timer 39 times out, the output C produces a pulse to increment the counter 41 connected to the output C.

The timer 39 has an OR logic 47 connected to the reset terminal thereof and the two inputs 1 and 2 of the OR logic 47 are connected to the close contact of the door switch 10 and the contact 2 of the forward end switch 4' through the inverters 6 and 48, respectively, so that the timer 39 is reset when the other timer 40 is activated or the forward end switch 4' is opened (when the slider reaches the forward end).

When the door switch 10 is closed, the output of the inverter 6 is rendered HIGH and it activates the timer 40 through the OR logic 49. Accordingly, in the normal state, the slider is moved backward and the counter 42 is decremented or cleared, and in the abnormal state (failure of the backward end switch 5'), the counter 42 is incremented.

The outputs of the counters 41 and 42 as well as the output of the inverter 6 are supplied to the OR logic 49. When the counter detects the failure of the forward end switch 4' or backward end switch 5', the input 1 or 2 of the OR logic 49 is rendered HIGH to activate the timer 40 so that the slider is moved to the backward end and held therein. Since the outputs f of the counters 41 and 42 are connected to the alarm lamp 21 through the OR logic 46, the alarm lamp 21 is fired if either of the counter outputs is HIGH.

In the embodiment of FIG. 4, since the timer 40 is reset each time the door is opened, a backward output is produced each time the door is closed when the counter 41 or 42 counts up. Alternatively, the circuit may be designed such that no output is produced (timer 40 is not cleared) when the counter counts up, or the timer 40 may be reset whenever the ignition switch is ON. The latter is shown in FIG. 4 by a broken line input pulse to the OR logic 50.

In the embodiment of FIG. 4, the counters 41 and 42 are reset, that is, the failure mode is reset by cutting off the battery. Alternatively, this may be done by turning off the ignition switch or key switch, or by a manual switch.

Figure 7:
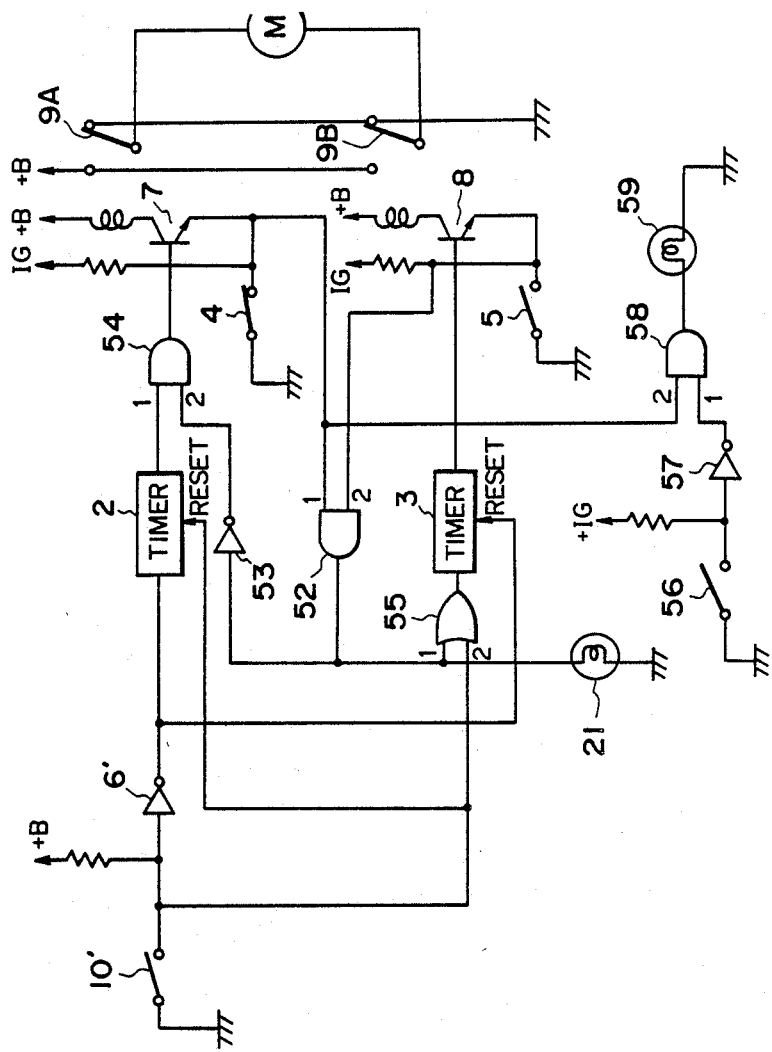
FIG. 7 shows a configuration of a fourth embodiment of the present invention.

FIG. 7 shows a fourth embodiment of the present invention. The like elements to those shown in FIGS. 2 to 4 are designated by the like numerals. In the present embodiment, when the forward end switch 4 and the backward end switch 5 simultaneously indicate that the seat belt is in the fasten state (or at the backward end) or in the non-fasten state (or at the forward end), it is determined as a system failure and an alarm is issued or the seat belt is driven backward.

Further, in the present embodiment, when a lock-state indicating switch of an emergency release buckle (not shown) provided in the seat belt indicates that the buckle is in the lock state and the forward end switch 4 indicates the non-fasten state of the seat belt, it is determined as a system failure and the alarm is issued.

This embodiment is explained below comparing with a conventional system.

In a conventional system, shown backward (or forward) end switch fails so that it produces a signal to indicate that the seat belt is at the backward (or forward) end while the door is open (or closed0, it is determined that the slider has reached the backward end (or forward end) even if the door is closed (or opened), so that the slider is not driven.

Thus, when the backward end switch fails and the slider stops at the forward end, the seat belt cannot fasten an occupant.

In such abnormal state, if the slider is at the forward end (or backward end), both the failed backward end switch (or forward end switch) and the normal forward end switch (or backward end switch) are open. In accordance with the invention, such a case is determined as failure and the alarm is issued.

The emergency release buckle is provided with a switch to indicate the insertion state of the tongue of the buckle. If it fails so that it always produces an output indicating that the tongue of the emergency release buckle is inserted, a latch state is detected even if the tongue is half-latched and not perfectly linked to the emergency release buckle. A conventional control system cannot detect such failure. (The failure of the emergency release buckle switch itself cannot be detected by a conventional alerts to means which alarms the non-insertion of the emergency release buckle.)

In general the emergency release buckle switch is actuated only when the slider is at the backward end because of the following reason. Since the slider anchor is driven along the slide rail, a harness must be attached to the slide anchor so that the harness is driven therewith if the control system to continuously check the insertion state of the tongue of the emergency release buckle. This is not easy to impliment because of possible breakage of the harness and difficulty in arranging the components. Accordingly, the emergency release buckle switch is actuated only when the slider is at the backward end to check the insertion state of the tongue. Specifically, when the tongue is inserted, a projection projects to the backside of the emergency release buckle and it pushes the emergency release buckle switch at the backward end so that the insertion of the tongue is checked. Accordingly, under normal conditions it is not possible that the emergency release buckle switch is actuated when the slider is not at the backward end. That is, when the slider is at the forward end, the emergency release buckle switch is not actuated. In accordance with the invention, if this state is not met, a failure is determined and an alarm is issued.

The embodiment of FIG. 7 applies the above conditions for implementation. The configuration and operation thereof are explained below.

The contacts of the forward end switch 4 and the backward end switch 5 are connected to the line +IG and the inputs 1 and 2 of the AND logic 52.

When the ignition switch is ON and the forward end switch 4 and backward end switch 5 are normal, the switches 4 and 5 are ON (close) when the slider is not at the forward end and backward end, respectively. Accordingly, one of the inputs 1 and 2 of the AND logic 52 is "0" and the output of the AND logic 52 is LOW and the alarm lamp 21 connected to the output of the AND logic 52 is not fired.

When the forward switch is ON (close), the output of the AND logic 52 is LOW and it is supplied to the inverter 53 so that the HIGH output of the inverter 53 is supplied to the input 2 of the AND logic 54. The timer 2 is connected to the other input 2 of the AND logic 54. Since the input 1 is HIGH, the AND logic 54 responds to the input 1. A door switch 10' is connected to the input of the inverter 2 through the timer 6'. The door switch 10' is closed when the door is open. When the forward end switch 4 is ON, the input of the timer 2 is rendered HIGH if the door is opened. Since the input 2 of the AND logic 54 is HIGH as mentioned before, the HIGH output of the timer 2 is supplied to the transistor 7 through the AND logic 54 to drive the motor M and move the slider forward.

When the backward end switch 5 is ON (or when the forward end switch 4 is ON), the output of the AND logic 52 is LOW as before-mentioned and the input 1 of the OR logic 55 connected to the output of the AND logic 52 is low. Accordingly, the OR logic 55 responds to the input 2. If the door is closed under this condition, the door switch 10' is turned off and the input 2 of the OR logic 55 is rendered HIGH to activate the timer 3 and drive the transistor 8 so that the slider is driven to the backward end. This is the operation in the normal state.

When the forward end switch 4 or backward end switch 5 fails so that the contact signals are both OPEN, the inputs 1 and 2 of the AND logic 52 are HIGH so long as the ignition switch is ON because the non-grounded contacts of the switches 4 and 5 are connected to the battery through the ignition switch, and the AND logic 52 is conditioned to fire the alarm lamp 21 connected to the output of the AND logic 52.

When the forward end switch 4 is OFF (open or non-fasten state) and the emergency release buckle switch 56 is ON (close), the input 1 of the AND logic 58 is rendered HIGH through the inverter 57, and the input 2 connected to the forward end switch 5 is HIGH because the forward end switch 5 is open. Thus, the AND logic 58 is conditioned to fire the alarm lamp 59.

Figure 8:
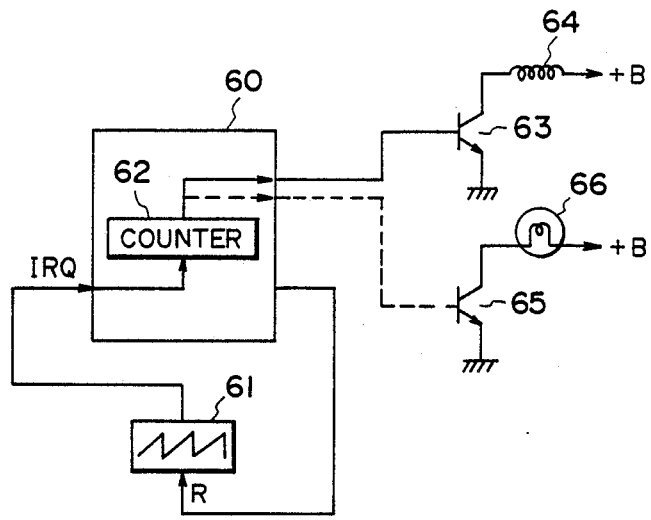
FIG. 8 shows a configuration of a fifth embodiment of the present invention.

FIG. 8 shows a fifth embodiment of the present invention. A microcomputer 60 controls the operation of the passive seat belt system, numeral 61 denotes a watch dog timer which monitors overrun of the microcomputer. When the watch dog timer 61 produces an output the microcomputer is restarted and the output of the watch dog timer 61 is counted by a counter 62 in the microcomputer. When the counter of the output of the watch dog timer 61 exceeds a predetermined count, a transistor 63 connected to the output of the microcomputer is turned on to activate a relay 64 so that the seat belt is driven backward. The counter 62 may be reset or decremented when the microcomputer operates in a normal loop.

Under this condition, the microcomputer may drive a transistor 65 to fire an alarm lamp 66.

The watch dog timer 61 is a self exciting ramp generator which supplies an output thereof to an interrupt request terminal IRQ of the microcomputer 60 when a voltage across a capacitor C charged through a resistor R exceeds a predetermined value. A time interval of the timer 61 is determined by circuit constants (C, R) and a set voltage. In a normal state (or when the microcomputer 60 is normal), reset pulses having a shorter period than the timer interval of the timer 61 are supplied to the watch dog timer 61 so that an output is not generated from the watch dog timer 61.

The microcomputer 60 may be structured as a main controller performing the functions of any of the before-mentioned embodiments of the present invention, for example.

Figure 9:
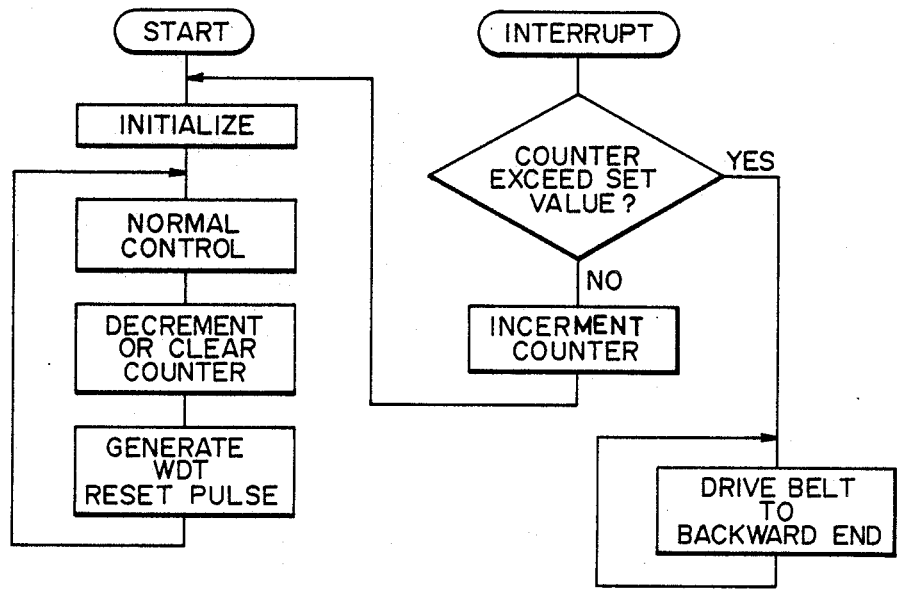
FIG. 9 is a flow chart showing an operation of the fifth embodiment.

FIG. 9 shows an operation of the microcomputer 60. The microcomputer 60 is interrupted by an output from the watch dog timer 61 and it is checked whether the counter 62 exceeds a set value or not. If the result is NO, the counter 62 increments and a routine of the microcomputer 60 is restarted. In the routine, an initialization step is performed, a normal control step is executed to control drive movement and/or issue an alarm as in the before-mentioned embodiments of the present invention, the counter 62 decrements or is cleared, and then the reset pulse is generated to supply to the watch dog timer 61. Thereafter the flow turns back to the normal control step.

When the counter 62 exceeds the set value in the interrupt routine, the computer 60 controls the slider to move to the fasten position and/or issue an alarm.

Figure 10:
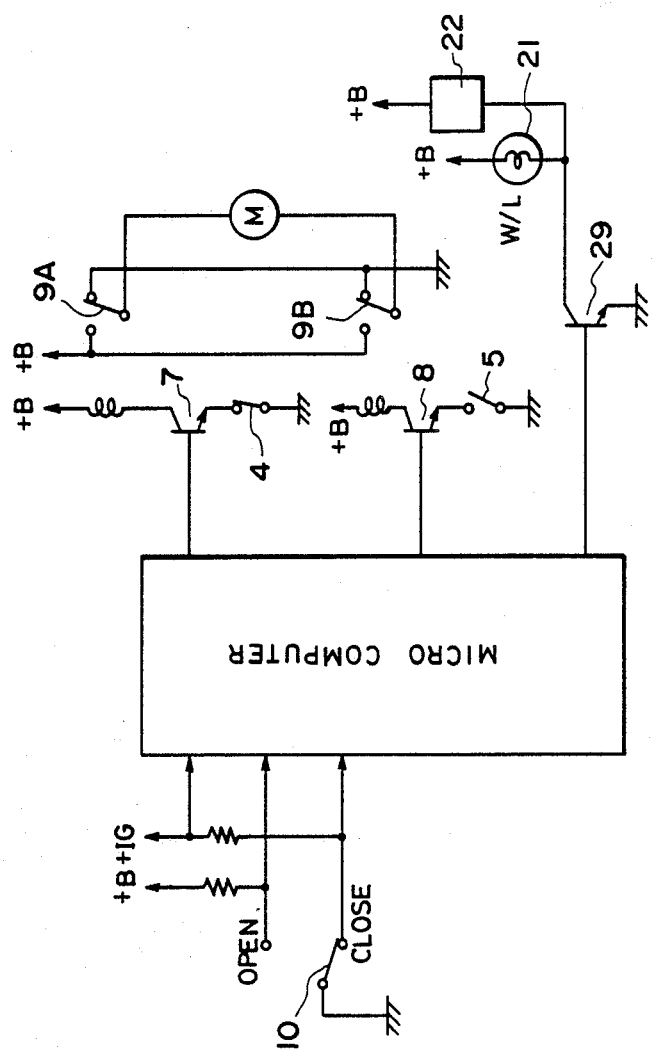
FIG. 10 shows a configuration of a sixth embodiment of the present invention.

FIG. 10 shows a sixth embodiment configured by utilizing a micro-computer as a main controller. This embodiment corresponds to the first or second embodiment shown in FIG. 2 or 3. The like elements are designated by the like reference numerals of FIGS. 2 and 3.

Figure 11:
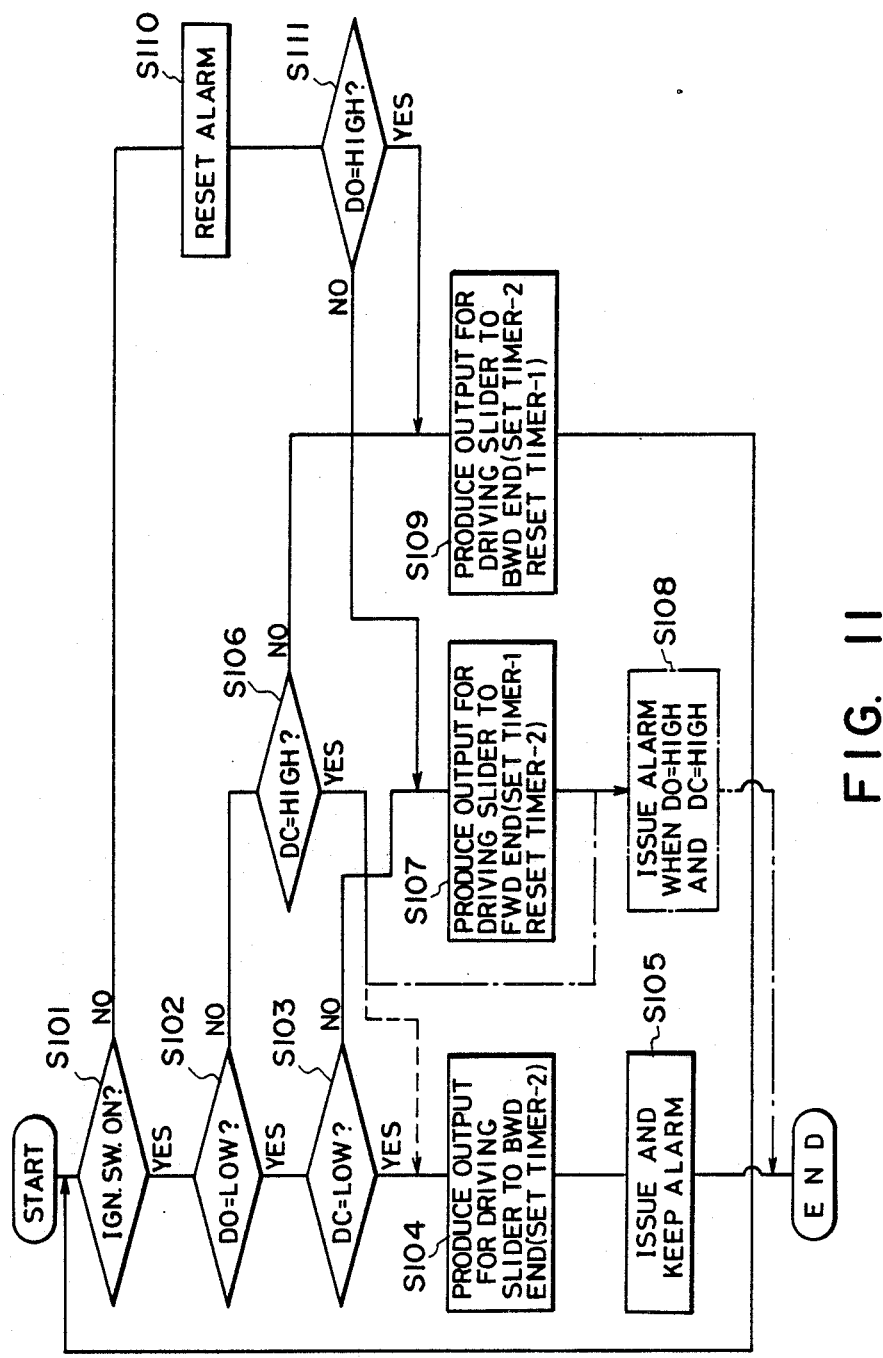
FIG. 11 is a flow chart showing an operation of the sixth embodiment.

The embodiment of FIG. 10 operates as shown in the flow chart of FIG. 11. "DO" and "DC" in the chart indicate two contacts signals from OPEN and CLOSE contacts of a door switch 10. The flow drawn by a dashed line indicates the embodiment corresponding to the first one in FIG. 2 and the flow drawn by a dot-dash line indicates the embodiment corresponding to the second one in FIG. 3.

In Step 101, if an ignition switch is ON, the flow advances to Step 102 where it is checked if DO is LOW. In Step 102, if DO is LOW, the flow advances to Step 103 where it is checked if DC is LOW. In Step 103, if DC is LOW, a timer-2 (timer 3 in FIGS. 2, 3) is energized to drive the slider to the backward end (Sstep 104) and an alarm is issued and kept on (that is, a lamp 21 is turned on and/or a chime 22 is sounded) (Step 105).

In Step 103, if DC is not LOW, the flow advanced to S107 where the timer-2 is reset and a timer-1 (timer 2 in FIGS. 2, 3) is energized to drive the slider to the forward end.

In Step 102, if Dc is not LOW, the flow advanced to Step 106 where it is checked if DC is HIGH. In the Step 106, if DC is HIGH, the flow advances to the Step 104 (like the first embodiment) or Step 108 (like the second embodiment). In the Step 108, DO is HIGH and DC is HIGH. This is a trouble caused due to a half closed door, etc., and an alarm is issued (but not kept on).

In the Step 106, if DC is not HIGH, the flow advances to Step 109 where the timer-1 is reset and the timer-2 is energized to move the slider to the backward end.

In the Step 101, if the ignition switch is not ON, the flow advances to Step 110 where the set alarm is released. Then it is checked if DO is HIGH (Step 111). If NO in the Step 111, the flow advances to the step 107. If YES in the Step 111, the flow advances to the Step 109.

Figure 12:
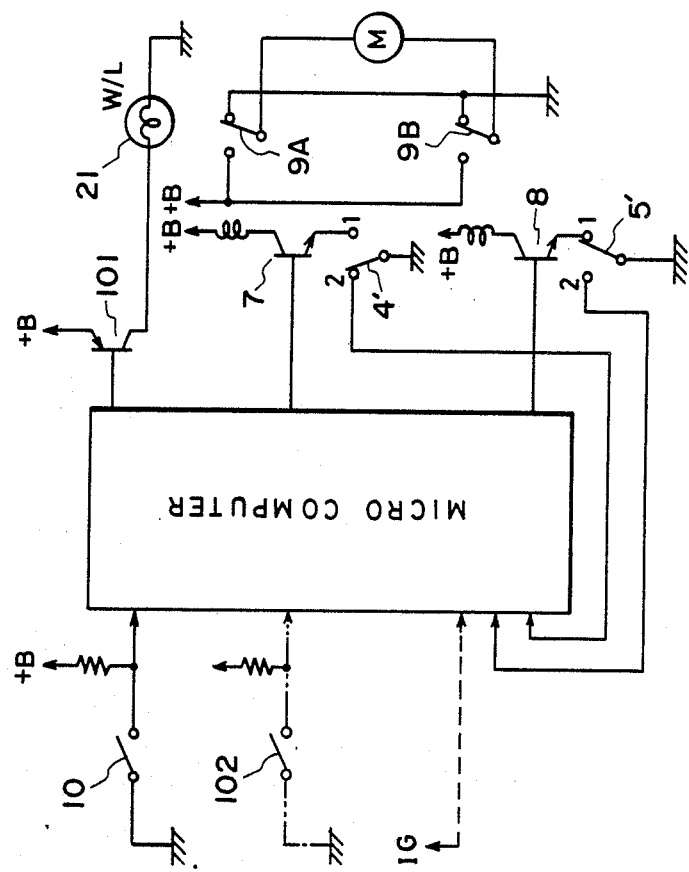
FIG. 12 shows a configuration of a seventh embodiment of the present invention.

FIG. 12 shows a seventh embodiment arranged by employing a microcomputer as a main controller. This embodiment corresponds to the third embodiment shown in FIG. 4. The like elements are designated by the like reference numerals shown in FIG. 4. The numeral 102 denotes a switch for timer-2, reset inhibit. The switch 102 is not shown in FIG. 4.

Figure 13A:
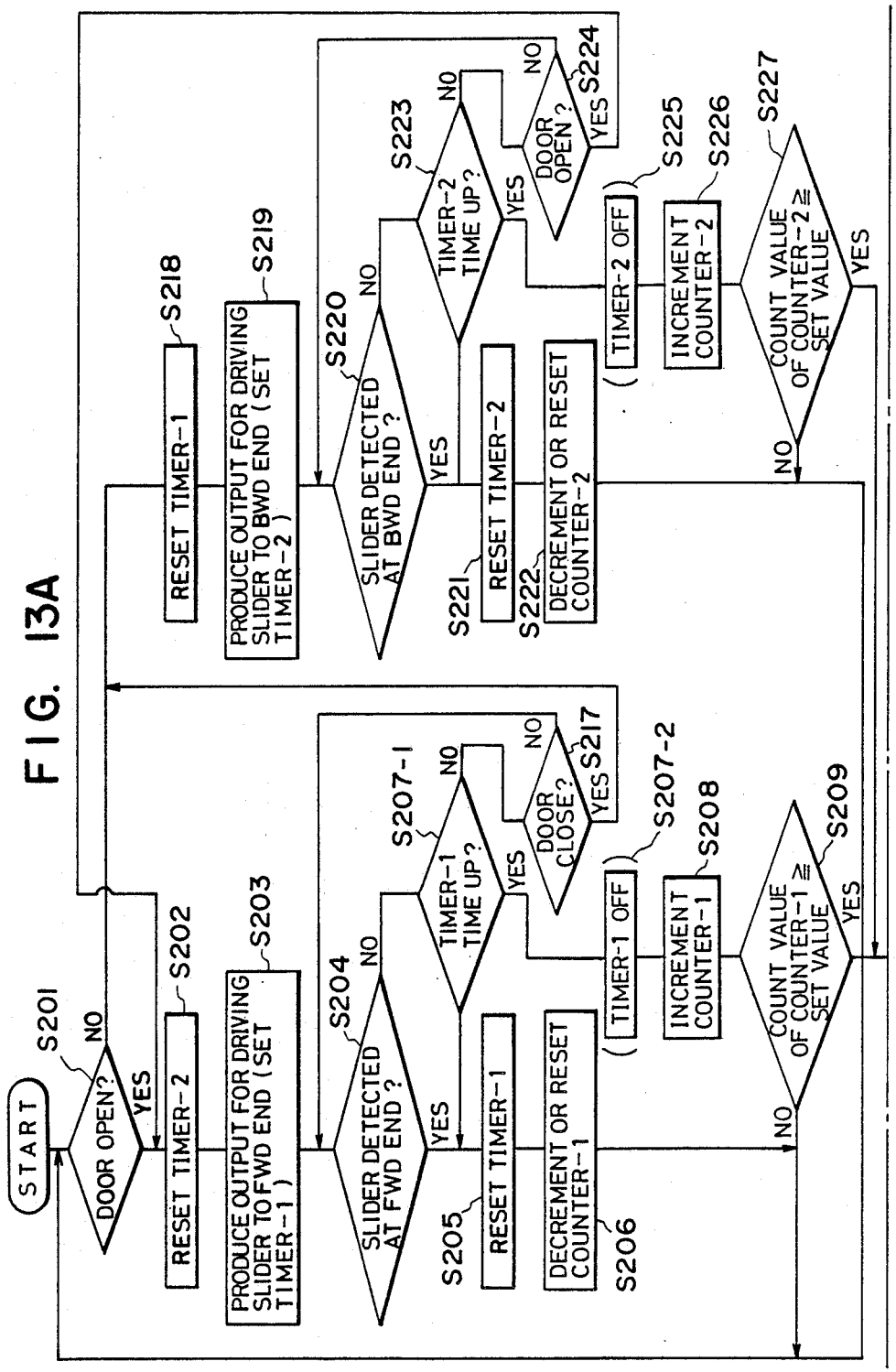
FIGS. 13A and 13B combined as shown in FIG. 13 are a flow chart showing an operation of the seventh embodiment.
Figures 13, 13B:
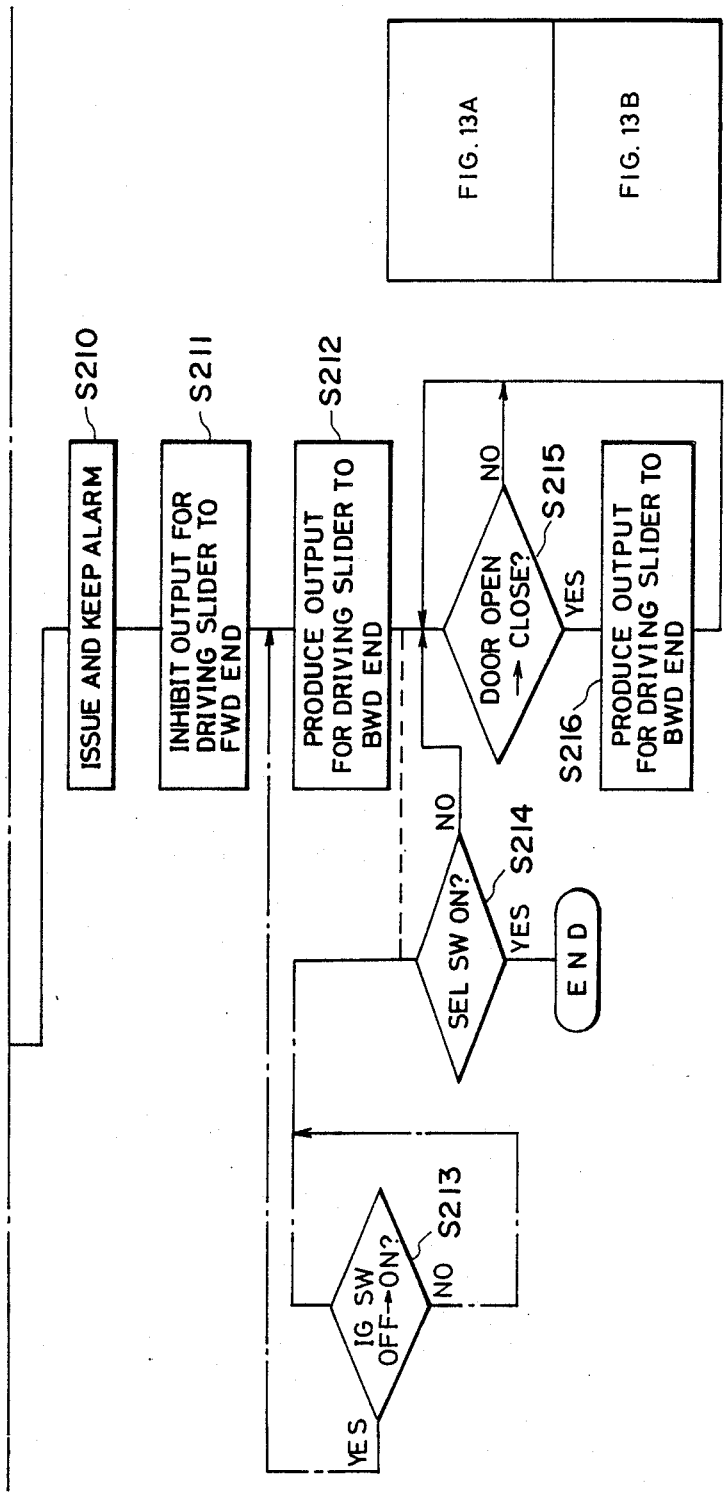

The seventh embodiment works according to the flow chart shown in FIGS. 13A and 13B.

The flow indicated by a dot-dash line represents that an output for driving the slider backward is produced whenever the ignition switch is turned on, and the flow designated by a dashed lien shows that a selection switch is provided, and if the selection switch is ON, the microcomputer is adapted to produce an output for moving the slider backward and thereafter retain the slider as it is.

In Step 201, if a door is open, a timer-2 (timer 3 on FIG. 4) is reset (Step 202) and a timer-1 (timer 2 on FIG. 4) is energized to drive the slider to the forward end (Step 203).

Then it is checked if the slider is detected at the forward end (non-fasten end) (Step 204). If YES in the Step 204, the flow advances the Step 205 where the timer-1 is reset. Then a counter-1 (counter 41 in FIG. 4) decrements or is reset (Step 206) and the flow returns to Step 201.

If NO in Step 204, it is checked if the timer-1 times out (time up) (Step 207-1). When YES in the Step 207-1, the timer-1 is reset if necessary (Step 207-2) and the counter-1 increments (Step 208). Then it is checked if a count value of the counter-1 is equal to or greater than a set value (Step 209). If NO in the Step 209, the flow returns to the Step 201. If YES in the Step 209, an alarm lamp 21 is fired and kept on (Step 210) and an output for driving the slider forward is inhibited (Step 211). Then the timer-2 is energized to move the slider backward (Step 212) and it is checked if the door changes from OPEN to CLOSE (Step 215). If NO in the Step 215, this step is repeated. If YES in the Step 215, an output for driving the slider backward is produced and the timer-2 times out. Then the flow returns to Step 215.

Step 213 and Step 214 are before-described as the flows indicated by the dot-dash line and the dashed line.

If NO in the Step 207-1, the flow advances to Step 217 where it is checked if the door is closed. If YES in the Step 217, the flow advances to Step 218 as described later. If NO in the Step 217, the flow returns to the Step 204.

In Step 201, when the door is not open, the timer-1 is reset (Step 218) and the timer-2 is energized to drive the slider to the backward end (Step 219). Then it is checked if the slider is detected at the backward end (or fasten end) (Step 220). If YES in the Step 220, the timer-2 is reset (Step 221) and a counter-2 (counter 42 in FIG. 4) decrements or is reset (Step 222). Then the flow returns to the Step 201.

If NO in the Step 220, it is further checked if the timer-2 times out (time up) (Step 223). When YES in Step 223, the timer-2 is reset if necessary (Step 225) and the counter-2 increments (Step 226). Then it is checked if a count value of the counter-2 is equal to or greater than a set value (Step 227). If NO in the Step 227, the flow returns to the Step 201. If YES in the Step 227, the flow advances to the Step 210.

When NO in the Step 223, it is checked if door is open (Step 224), if NO in the Step 224, the flow advances to the Step 220, if YES in the Step 224, the flow returns to the Step 202.

Figure 14:
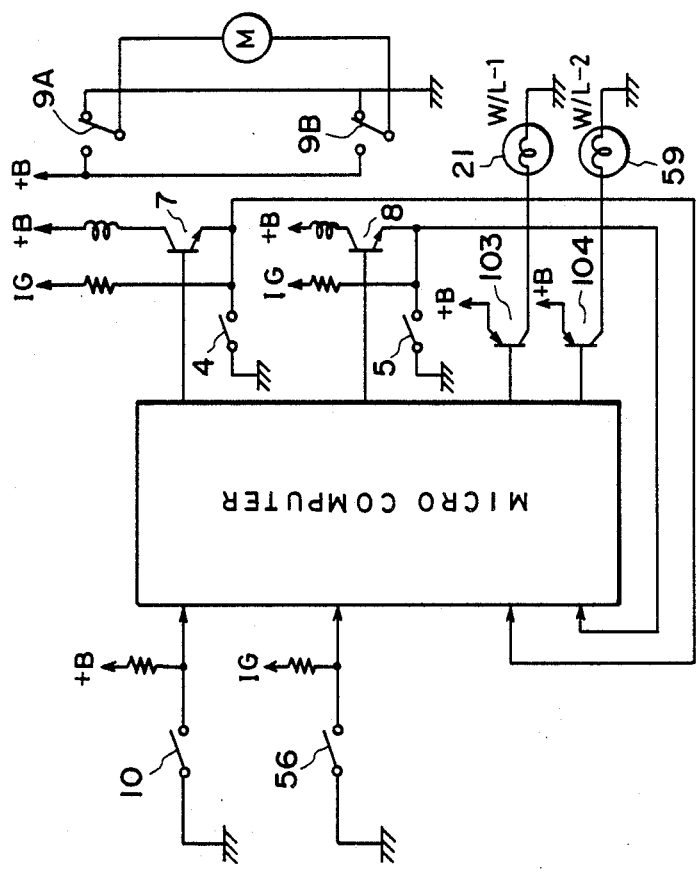
FIG. 14 shows an configuration of a eighth embodiment of the present invention.

FIG. 14 shows an eighth embodiment structured by using a microcomputer as a main controller. This embodiment corresponds to the fourth one shown in FIG. 7, the like elements being designated by the like reference numerals of FIG. 7.

Figure 15:
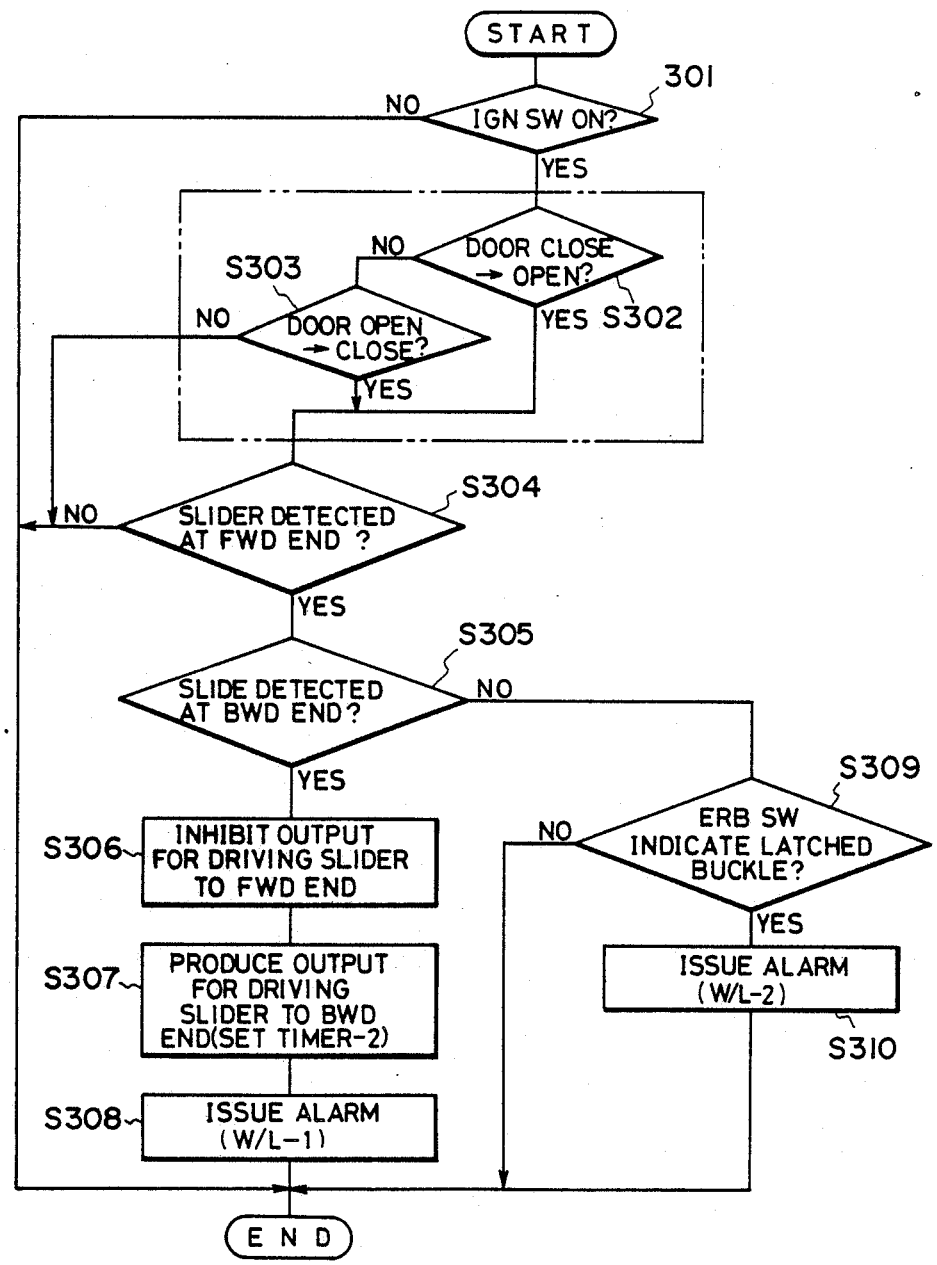
FIG. 15 is a flow chart showing an operation of the eighth embodiment.

The eighth embodiment functions according to the flow chart of FIG. 15.

In FIG. 15, the Steps 302 and 303 may be passed through.

In Step 301, if the ignition switch is ON, the flow advances to Step 302 where it is checked if a door switch 10 changes from CLOSE to OPEN. If YES in the Step 302, the flow advances to Step 304 where it is checked whether the slider is detected at the forward end (release end). If YES in the Step 304, it is checked whether the slider is detected at the backward end (Step 305). If YES in the Step 305, an output for driving the slider to the forward end is inhibited (Step 306). Then a timer-2 (timer 3 in FIG. 7) is energized to produce an output for driving the slider to the backward end (Step 307) and an alarm lamp 21 is activated (Step 308).

If NO in the Step 305, the flow advances to Step 309 to check whether an emergency release buckle switch indicates that a buckle is latched. If NO in the Step 309, the flow is terminated. If YES in the Step, an alarm lamp 59 is fired (Step 310).

When NO in the Step 304, the flow is terminated.

When NO in the Step 302, the flow goes to Step 303 where it is checked if the door switch changes from door-open to door-close. If YES in the Step 303, the flow goes to the Step 304. If NO in the Step 303, the flow is terminated.

If NO in the Step 301, the flow is terminated.

Another embodiment of the invention is shown in FIG. 16. This embodiment incorporates the aforementioned Steps S302, S303 of the FIG. 14 embodiment (see FIG. 15) and controls the slider drive motor similarly to the FIG. 14 embodiment. However, it is constructed with logic circuits.

The general configuration of the FIG. 16 embodiment is similar to that of FIG. 7 (the emergency release buckle monitoring circuit of FIG. 7 is not shown in FIG. 16 but could similarly be included), and elements corresponding to those of FIG. 7 are designated by the same reference numbers. The modifications in the FIG. 16 embodiment will now be described.

Referring to FIG. 16, an output signal from AND logic 52 is supplied to inverter 53 and OR logic 55 through a D-type flip-flop 63. A clock input port C of the flip-flop 63 is connected with an OR logic 64 which receives complementary signals taken respectively from an input and an output of inverter 6'. These signals correspond to respective "close" and "open" states of a door switch 10'.

A reset port R of the flip-flop 63 is connected through an inverter 65 to a line from an ignition switch. Alternatively, the reset port may be connected to a line +B of from a power source.

The truth table of the D-type flip-flop 63 is shown in FIG. 17. When the door switch changes from "open" to "close" or from "close" to "open", an input port 1 or 2 of the OR logic 64 receives a level "1" (HIGH) signal from the input or output of the inverter 6', and OR logic 64 outputs the level "1" signal to the port C of the flip-flop 63. Thus, the input to the port C of the flip-flop 63 changes from "0" to "1", and in accordance with the above-mentioned truth table the flip-flop 63 latches an input at a port D thereof. Thus, it is only at the time when the door is opened or closed that the input to port D is examined to discriminate whether the slider is indicated as being at both the forward and backward ends of travel at the same time.

If the ignition switch is turned off, the voltage on the line IG falls to zero so that the flip-flop 63 is reset.

The FIG. 16 embodiment offers an additional measure of safety as compared to the embodiment of FIG. 7. In the FIG. 7 embodiment, when the ignition switch is ON, the system continuously checks for indications that slider is at both the forward and backward ends of travel at the same time. Therefore, even when the seat belt has not moved, a failure may be indicated if a detection means goes into a temporary failure state or if some other temporary failure occurs, such as an error in contact of a switch, a temporary failure due to sustained noise, or the opening of a loose connection.

By contrast, in the FIG. 16 embodiment, it is only when the door changes from an open state to a closed state or vice-versa—that is, only when the seat belt is to perform its normal fastening and releasing functions—that the state of the slider is examined. Therefore, the FIG. 16 embodiment is not subject to the possible failure indications just described.

In accordance with the present invention, the alarm is issued or the seat belt is driven backward when the detection means used for controlling the operation of the passive seat belt fails. Accordingly, the fault location may be rapidly detected and the vehicle occupants may be always kept fastened.

The present invention is not limited to the illustrated embodiments and various modifications may be made without departing from the scope of the claims.

We claim:

1. A passive seat belt system comprising:
   drive means for reciprocating a seat belt;
   first detection means responsive to opening and closing of a door for generating sets of door-state indicating detection output signals, with different sets of said signals confirming different states of the door;
   second detection means activated when a slider of the seat belt is at a predetermined position;
   first control means for controlling said drive means in accordance with detection outputs of said first and second detection means; and
   second control means for causing said first control means to drive said seat belt backward when said first detection means produces a set of detection output signals which disagree as to the state of the door at a given time.

2. A passive seat belt system according to claim 1 wherein said second control means issues an alarm when said first detection means produces a set of detection output signals which disagree as to the state of the door at a given time.

3. A passive seat belt system according to claim 1 wherein said first detection means produces sets of at least two door-state indicating detection output signals, each said signal having modes respectively indicating an open state and a closed state of the door, and said second control means causes said first control means to drive said seat belt backward when the modes of said signals are different.

4. A passive seat belt system according to claim 1 wherein said second control means restricts the operation of said first control means so that the seat belt is not driven backward when said first detection means indicates a particular abnormal state.

5. A passive seat belt system according to claim 1 wherein said second detection means includes a switch for detecting a latch state of an emergency release buckle of the seat belt, and said second control means causes said first control means to drive the seat belt backward when said second detection means detects a latch state of the emergency release buckle when said slider is at a forward end of travel.

6. A system comprising:
   drive means for reciprocating a seat belt;
   first detection means responsive to opening and closing of a door;
   second detection means activated when a slider of the seat belt is at a predetermined position;
   first control means for controlling said drive means in accordance with detection outputs of said first and second detection means; and
   second control means for causing said first control means to drive said seat belt backward when said second detection means fails or is in an abnormal state;
   said first control means including a timer for controlling an actuation time of said drive means;
   said second control means including a counter for counting time-outs of said timer;
   whereby the seat belt is driven backward and/or an alarm is issued when the count of time-outs in the counter exceeds a predetermined count.

7. A system according to claim 6 wherein said second control means clears or decrements said counter when said second detection means is activated before the time-out of said timer.

8. A passive seat belt system comprising:
   drive means for reciprocating a seat belt;

first detection means responsive to opening and closing of a door;

second detection means activated when a slider of the seat belt is at a forward end of travel and when the slider is at a backward end of travel;

first control means for controlling said drive means in accordance with detection outputs of said first and second detection means; and second control means for causing said first control means to drive said seat belt backward when said second detection means indicates that the slider is at both the forward end of travel and the backward end of travel at the same time.

9. A passive seat belt system according to claim 8, wherein said second control means issues an alarm when said second detection means indicates that the slider is at both the forward end of travel and the backward end of travel at the same time.

10. A passive seat belt system according to claim 8, wherein said second control means performs its aforesaid function only upon opening of the door and upon closing of the door.

11. A passive seat belt system according to claim 10, wherein said second control means starts an alarm when it performs its aforesaid function.

* * * * *